United States Patent [19]
Jäger

[11] Patent Number: 5,902,021
[45] Date of Patent: May 11, 1999

[54] SNOWMOBILE ROLLER BELT ARRANGEMENT HAVING DRIVE MEMBERS ATTACHED BY A SCREW CONNECTION WITH ELASTIC CUSHION

[76] Inventor: Arnold Jäger, Gehrbergsweg 6, D-31303 Burgdorf, Germany

[21] Appl. No.: 08/803,204

[22] Filed: Feb. 21, 1997

[30] Foreign Application Priority Data

Feb. 23, 1996 [DE] Germany ............... 296 03 250 U

[51] Int. Cl.⁶ .................................................. B62D 55/26
[52] U.S. Cl. ..................... 305/162; 305/180; 305/181
[58] Field of Search .......................... 305/160, 161, 305/162, 180, 181, 191, 192; 198/697, 732

[56] References Cited

U.S. PATENT DOCUMENTS

| | | | |
|---|---|---|---|
| 2,064,890 | 12/1936 | Dorst | 305/180 |
| 3,958,839 | 5/1976 | Nodwell | 305/181 |
| 5,199,771 | 4/1993 | James et al. | 305/162 |
| 5,462,495 | 10/1995 | Jäger | 305/162 X |

*Primary Examiner*—Russell D. Stormer
*Attorney, Agent, or Firm*—Robert W. Becker & Associates

[57] ABSTRACT

A roller belt arrangement for a track-type vehicle has pull-resistant belts with a first surface and a second surface opposite the first surface. Drive members are connected to the first surface of the pull-resistant belt so as to extend transverse to a longitudinal extension of the at least one pull-resistant belt. U-shaped members, having a stay and two legs defining a cavity therebetween, are positioned on a second surface opposite the drive members such that the stay rests on the second surface. Cushion members are positioned in the cavity of the U-shaped members. Screw bolts for connecting the drive members to the pull-resistant belt are provided. The screw bolts extend sequentially through the cushion member, the stay of the U-shaped member, the pull-resistant belt, and the drive member. The screw bolts are directly threaded into the drive members.

9 Claims, 2 Drawing Sheets

SNOWMOBILE ROLLER BELT ARRANGEMENT HAVING DRIVE MEMBERS ATTACHED BY A SCREW CONNECTION WITH ELASTIC CUSHION

BACKGROUND OF THE INVENTION

The invention relates to roller belt arrangements for track-type vehicles, especially for snowmobiles, with one or more parallel extending, pull-resistant belts to which are connected transversely extending drive members with the aid of screw bolts extending through the belts and the head portion of the drive members. The screw bolts furthermore penetrate U-shaped members positioned opposite the drive members on the other side of the belt whereby the drive member attachment includes a cushion member comprised of rubber or a rubber-like material (elastomer) with bores for allowing penetration of the screw bolts.

In known roller belt arrangements of this kind, as disclosed in U.S. Pat. No. 5,462,495, the cushion member comprised of rubber or a rubber-like material is arranged at the ends of the screw bolts connected to the drive member. In this embodiment, the drive members are profiled steel members with a U-shaped head portion and the cushion member is arranged between the legs of the U-shaped head portion. The screw bolt is threaded into threaded bores of a bar that pushes the cushion member against the stay.

The cushion member in such arrangements can be mounted in a simple manner only in open profiled members such as a U-shaped profiled member. However, for reasons of stability it is more advantageous to use drive members with closed profiled members. Closed profiled members can be manufactured in a more light-weight construction than open profiled members while providing a greater stability so that the risk of being bent or broken off during operation of the roller belt arrangement is reduced.

It is therefore an object of the present invention to improve a roller belt arrangement of the aforementioned kind such that an excellent elastic securing and easy mountability especially for a drive member with a hollow head portion can be achieved.

SUMMARY OF THE INVENTION

A roller belt arrangement for a track-type vehicle, especially a snowmobile, according to the present invention is primarily characterized by:

At least one pull-resistant belt having a first surface and a second surface opposite the second surface;

Drive members connected to the first surface of the at least one pull-resistant belt so as to extend transverse to a longitudinal extension of the at least one pull-resistant belt;

U-shaped members, comprising a stay and two legs defining a cavity therebetween, positioned on the second surface opposite the drive members such that the stay rests on the second surface;

Cushion members positioned in the cavity of the U-shaped members;

Screw bolts for connecting the drive members to the at least one pull-resistant belt, the screw bolts penetrating sequentially the cushion member, the stay of the U-shaped member, the at least one pull-resistant belt, and the drive member;

The screw bolts directly threaded into the drive members.

Advantageously, the drive members comprise a securing plate and the screw bolts are threaded into the securing plate.

Advantageously, at least two pull-resistant belts are provided and they extend preferably parallel to one another.

The cushion members extend over the entire length of the drive members. The cushion members have receiving bores for receiving the screw bolts. The cushion members have longitudinal sides with grooves that extend parallel to the bores.

The screw bolts have a bolt head and a top surface of the bolt head and free ends of the two legs of the U-shaped members are preferably in a flush arrangement.

The distance between the two legs is preferably greater than the diameter of a circle circumscribing the bolt head.

The distance is preferably 8 to 15 mm greater than the diameter.

The cushion members extend to half the height of the two legs of the U-shaped members.

The drive members have a head portion resting at the first surface, whereby the head portion is a hollow profiled member.

The drive members preferably comprise a curing plate positioned inside the hollow profiled members. The screw bolts are threaded into the securing plates.

According to the present invention, the cushion member is arranged within the cavity of the U-shaped profiled member and the screw bolt is directly threaded into the drive member or into a securing plate that is part of the drive member.

Preferably, in the inventive roller belt arrangement the drive members are closed profiled members. They can be manufactured of a more light-weight construction but with great stability than a drive member with open profiled member. For example, instead of steel conventionally used for drive members it is possible to produce the drive members of a light metal.

Therefore, it is thus possible to attach to the inventive roller belt arrangement closed profiled members without having to cope with any limitations in regard to the design of the cushion member and thus without having to cope with any disadvantages in regard to its effectiveness. Furthermore, there is no additional expenditure in regard to mounting, as, for example, would be the case in regard to a cushion member to be introduced and positioned together with an abutment etc. in the interior of the hollow elongate head portion of the drive member. Furthermore, the cushion member is better protected at the inner side of the roller belt arrangement as compared to be positioned at the running surface of the roller belt arrangement.

The cushion member provides for a non-rigid but elastic loading of the screw bolt. Furthermore, the drive member can also perform certain compensation movements when loaded without loosing its capability of providing the desired traction. In order to further improve such deflecting movements, the screw bolt is preferably guided with minimal play through the bore within the U-shaped profiled member.

Advantageously, the cushion member is prestressed. It is expedient to arrange it within the U-shaped profiled member such that it fills out the space between the legs of the U-shaped profiled member and is pressed by the bolt head of the screw bolt against the stay of the U-shaped member. The height of the cushion member is, for example, approximately half the leg height of the U-shaped member. The bolt head of the, screw bolt (i.e. the top surface) is advantageously positioned so as to be flush (aligned) with the free ends of the two legs of the U-shaped member.

In order to allow under these conditions an elastic deformation of the elastomer (rubber) body of the cushion member, the cushion member comprises recesses (grooves) which under prestress (clamping) will become smaller, respectively, are filled by the expanding rubber (elastomer) material.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
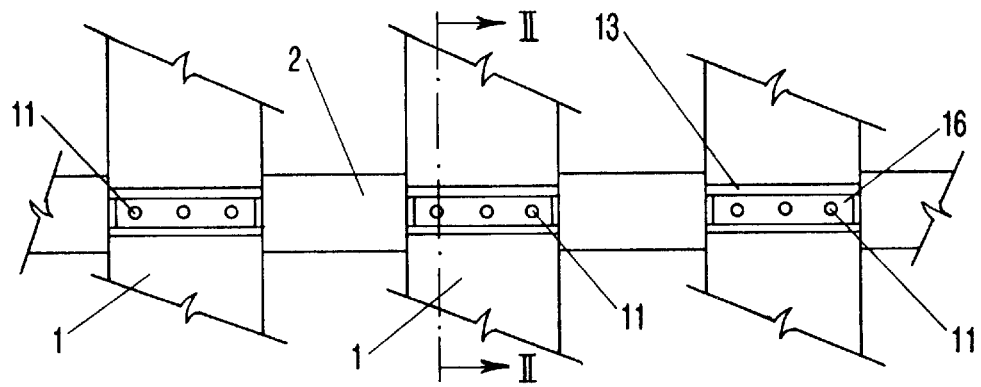
FIG. 1 shows a portion of a roller belt arrangement for a track-type vehicle (snowmobile) onto a surface of the roller belt arrangement opposite the running surface.
Figure 2:
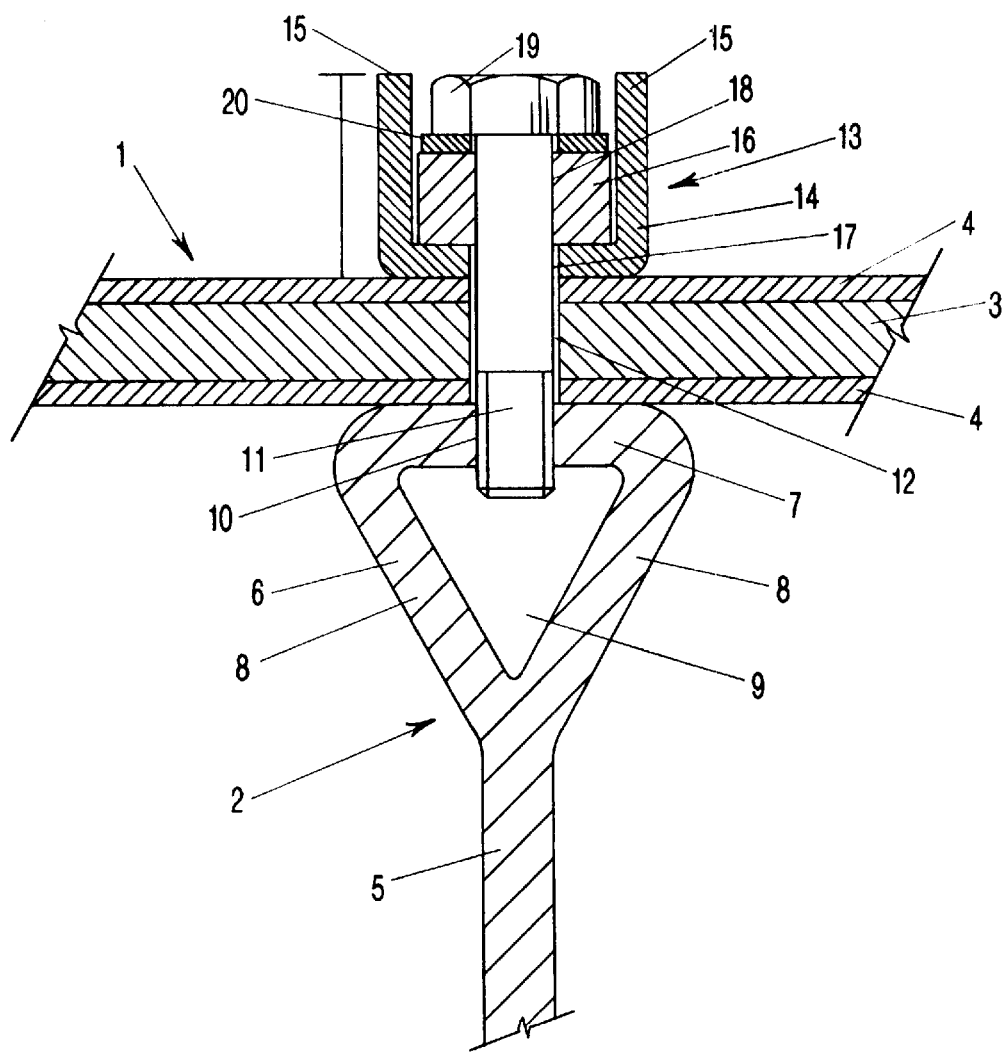
FIG. 2 shows a section along the line II—II of FIG. 1.

The roller belt arrangement is comprised substantially of five (only three are shown in FIG. 1), parallel extending, pull-resistant bendable (elastic) rotating belts 1 which are guided on wheels provided at the vehicle. Attached to the belts 1 are transversely extending drive members 2 which provide propelling action in the snow. The drive members 2 extend over the entire width of the roller belt arrangement and bridge the spacing between the belts 1.

The belts 1 have a pull-resistant core 3 in the form of stacked rubberized fabric layers as a full (solid) fabric core. The core 3 is covered at the bottom and the top by adhesively attached cover layers 4 comprised of rubber.

The drive members 2 are formed by profiled members, for example, consisting of aluminum. A drive member 2 is comprised of the actual gripper or follower part 5 and a head portion 6. The head portion 6 comprises a stay 7 which rests at the belt 1 and two legs 8. The legs 8 converge in a V-shape toward one another and have a transition into the gripper or follower part 5. Stay 7 and legs 8 form a closed profile with an interior hollow space 9.

In the area of each belt 1, the stay 7 has three threaded bores 10 spaced from one another into which the screw bolts 11 can be introduced. The screw bolts 11 serve to fasten the drive member 2 to the belt 1.

The screw bolts 11 extend through holes 12 within the belts 1. The side of the belt 1 facing away from the drive member 2 is provided with U-shaped profiled members 13 arranged so as to be aligned with the drive members 2. They comprise a stay 14 with two perpendicularly extending legs 15. The height of the legs 15 is indicated by reference letter S in FIG. 2. Within the U-shaped profiled member 13 a cushion member 16 is arranged which consists of rubber or a rubber-like material (elastomer).

The stay 14 of the profiled member 13 and the cushion member 16 have respective bores 17 and 18 through which the screw bolts 11 extend. The screw bolts 11 have bolt heads 19 which in a conventional manner are provided with six lateral surfaces as contacting surfaces for a wrench or a similar tool. The bolt head 19 of the screw bolts loads with a washer 20 the cushion member 16. Instead of the washer 20 a stay with three holes may be used. By tightening the screw bolts a prestress can be introduced into the cushion member 16, i.e., the cushion member 16 is compressed.

The height of the cushion member 16 corresponds substantially to half the height S of the legs 15. The bolt head 19 of the screw bolt is substantially flush (aligned) with the free ends of the legs 15. The distance between the legs 15 is approximately 8 to 15 mm greater than the diameter of a circle circumscribing the bolt head 19 of the screw bolt 11 (i.e., a circle extending through the outermost points of the bolt head in an end view) so that the head 19 is accessible for wrenches or similar tools.

Figure 3:
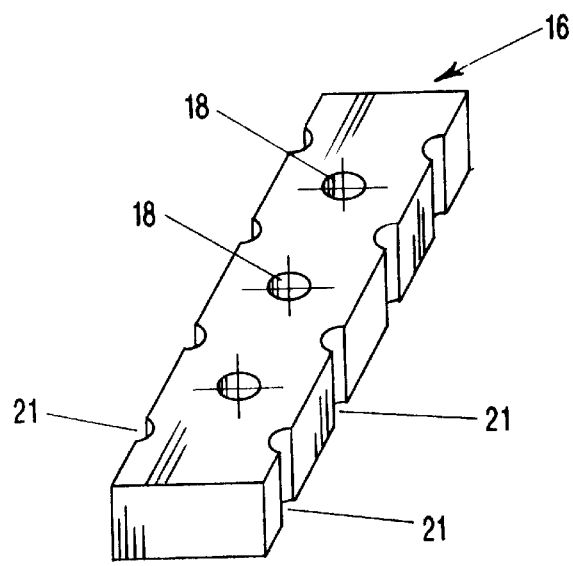
FIG. 3 shows in a perspective representation the cushion member for a roller belt arrangement according to FIG. 1, the cushion member being comprised of rubber.

The cushion member 16 extends over the entire length of the profiled member 13. It is provided laterally with a plurality of groove-shaped recesses 21 which extend parallel to the bores 18 (FIG. 3). The recesses or grooves allow for an elastic deformation of the cushion member 16. They provide a compensation space for the rubber being deformed, on the one hand, when the prestress is introduced and, on the other hand, when the cushion member 16 during operation of the roller belt arrangement is deformed by movement of the drive member 2. The arrangement of the grooves parallel to the bores 18 is favorable with respect to the manufacture of the cushion member 16, for example, in regard to removing it from the mold used during its manufacture.

The use of the cushion members 16 results in an elastic securing of the drive member 2. This elastic securing action is further reinforced since the stay 7 of the drive member 2 also rests at a rubber layer (i.e., an elastic material) provided by the cover layer 4 of the belt 1. An even more favorable securing action is achieved when the diameter of the bore 17 within the stay 14 is selected to be approximately 5 to 15% greater than the diameter of the screw bolt 11. However, it is also possible to select the diameter of the hole or bore 12 within the belt 1 to be greater than the diameter of the screw bolt 11. For such selected diameters, the drive member 2 can perform small tilting movements relative to the belt which are elastically compensated and limited by the cushion members 16.

Figure 4:
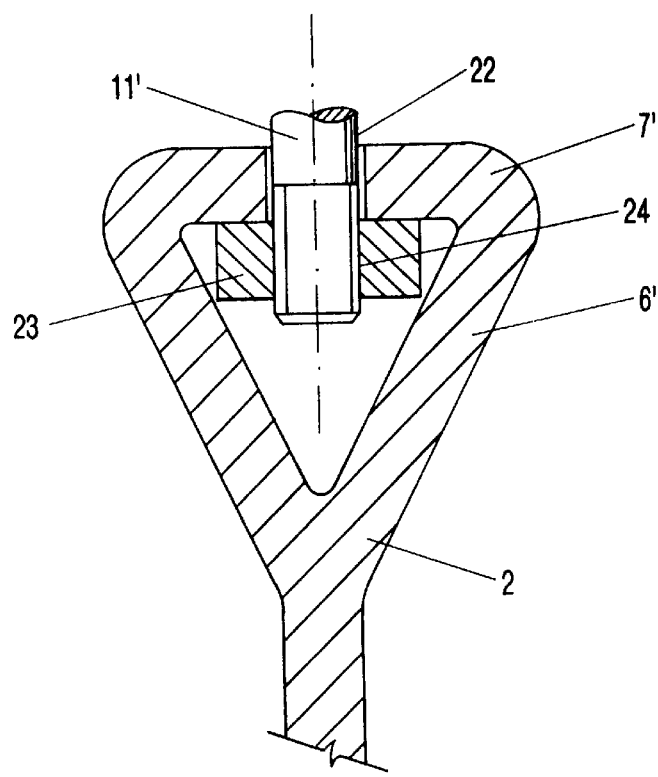
FIG. 4 shows another embodiment of the invention.

FIG. 4 shows another embodiment of the invention. According to this embodiment, the drive member 2' has a head portion 6' with a smooth bore 22 instead of a threaded bore. In the interior of the head portion 6' a plate 23 is provided which has threaded bores 24 into which the screw bolts 11' are threaded.

The mounting of the drive member 2 or 2' to the belts 1 is carried out in all cases in a simple manner by threading the screw bolt 11, or 11' into the drive member 2 or 2'.

The present invention is, of course, in no way restricted to the specific disclosure of the specification and drawings, but also encompasses any modifications within the scope of the appended claims.

What I claim is:

1. A roller belt arrangement for a track vehicle, said roller belt arrangement comprising:

at least one pull-resistant belt having a first surface and a second surface opposite said first surface;

drive members connected to said first surface of said at least one pull-resistant belt so as to extend transverse to a longitudinal extension of said at least one pull-resistant belt;

U-shaped members, comprising a stay and two legs defining a cavity therebetween, positioned on said second surface opposite said drive members such that said stay rests on said second surface;

a cushion member positioned in said cavity of said U-shaped members;

screw bolts for connecting said drive members to said at least one pull-resistant belt, said screw bolts penetrating sequentially said cushion member, said stay of said U-shaped members, said at least one pull-resistant belt, and said drive member;

said screw bolts directly threaded into said drive members; said cushion members extending over the entire length of said drive members;

said cushion members having receiving bores for receiving said screw bolts; and said cushion members having longitudinal sides having grooves extending parallel to said bores.

2. A roller belt arrangement according to claim 1, wherein said drive members comprise a securing plate and wherein said screw bolts are threaded into said securing plates.

3. A roller belt arrangement according to claim 1, wherein at least two of said pull-resistant belts are provided and wherein said pull-resistant belts extend parallel to one another.

4. A roller belt arrangement according to claim 1, wherein said screw bolts have a bolt head having an end surface heads, wherein said two legs of said U-shaped members have free ends and wherein said end face and said free ends are in a flush arrangement.

5. A roller belt arrangement according to claim 4, wherein said two legs are spaced at a distance and wherein said distance is greater than a diameter of a circle circumscribing said bolt head.

6. A roller belt arrangement according to claim 5, wherein said distance is 8–15 mm greater than said diameter.

7. A roller belt arrangement according to claim 1, wherein said legs if said U-shaped members have a height and wherein said cushion members extend to half said height of said two legs.

8. A roller belt arrangement according to claim 1, wherein said drive members have a head portion resting at said first surface, said head portion being a hollow profiled member.

9. A roller belt arrangement according to claim 8, wherein said drive members comprise a securing plate positioned inside said hollow profiled members, wherein said screw bolts are threaded into said securing plates.

* * * * *